(12) United States Patent
Bobay et al.

(10) Patent No.: US 6,286,199 B1
(45) Date of Patent: Sep. 11, 2001

(54) METHOD FOR ASSEMBLY OF MOTOR WITH EXTERNAL ROTOR

(75) Inventors: Dennis P. Bobay, Ossian; Glen C. Young, Fort Wayne, both of IN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/405,996

(22) Filed: Sep. 24, 1999

Related U.S. Application Data

(62) Division of application No. 08/955,515, filed on Oct. 21, 1997, now Pat. No. 5,962,938.

(51) Int. Cl.⁷ ................................................. H02K 15/02
(52) U.S. Cl. ..................... 29/596; 264/272.2; 310/40.5; 310/42; 310/43; 310/67 R; 310/193; 310/216
(58) Field of Search .................. 29/596, 598; 264/272.2; 310/40.5, 43, 67 R, 68 R, 254, 257, 193, 216, 42

(56) References Cited

U.S. PATENT DOCUMENTS

| | | |
|---|---|---|
| 2,427,947 | 9/1947 | Koch . |
| 2,500,592 | 3/1950 | Whiteley . |
| 2,571,672 | 10/1951 | Bradley . |
| 2,839,697 | 6/1958 | Pierce et al. . |
| 2,857,534 | 10/1958 | Beach . |
| 3,210,577 * | 10/1965 | Hogne ........................ 264/272.2 X |
| 3,305,740 | 2/1967 | Shano . |
| 3,336,092 | 8/1967 | Dochterman . |
| 3,427,485 | 2/1969 | Dotto . |
| 3,441,763 | 4/1969 | Patrignani . |
| 3,459,982 | 8/1969 | Cartier . |
| 3,493,800 | 2/1970 | Barrett . |
| 3,496,393 | 2/1970 | Reifman et al. . |
| 3,501,661 | 3/1970 | Heinzen et al. . |
| 3,508,091 | 4/1970 | Kavanaugh . |
| 3,541,363 | 11/1970 | Vettermann et al. . |
| 3,549,925 | 12/1970 | Johnson . |
| 3,551,711 | 12/1970 | Davis . |
| 3,553,510 | 1/1971 | Howey . |
| 3,603,825 | 9/1971 | Sheridan et al. . |
| 3,675,060 | 7/1972 | Hills . |

(List continued on next page.)

FOREIGN PATENT DOCUMENTS

| | | |
|---|---|---|
| 0 299 512 | 7/1988 | (EP) . |
| 0 591 724 | 9/1993 | (EP) . |
| 2 570 228 | 9/1984 | (FR) . |
| 213 797 | 6/1941 | (SE) . |

OTHER PUBLICATIONS

"AMP Product Guide", AMP Incorporated, Harrisburg, PA; 1991; pp. 3268–3269.

"Surface Mount & Through Hole Interconnection & Assembly Solutions", Zierick Manufacturing Corporation, Mount Kisco, NY; published before Oct. 21, 1997.

M.Weh et al., "New Permanent Magnet Excited Synchronous Machine with High Efficiency at Low Speeds", Institut fur elektrishe Mashinen; published before Oct. 21, 1997.

Translation of Switzerland Patent No. 213 797 published Jun. 3, 1941, pp. 1–4.

Translation of EPO Patent No. 0 591 724 dated Sep. 15, 1993, pp. 1–10.

*Primary Examiner*—Carl E. Hall
(74) *Attorney, Agent, or Firm*—Carl B. Horton; Damian G. Wassenbauer; Armstrong Teasdale LLP

(57) ABSTRACT

A method for assembling an inside out motor includes the step of stacking a plurality of laminations together to form a pole member. A stator is molded around the pole member so that an end of the pole member is located adjacent an exterior surface of the molded stator. An electrically conductive magnet wire is wound around the molded stator adjacent the pole member to form a winding of the motor.

6 Claims, 3 Drawing Sheets

U.S. PATENT DOCUMENTS

| | | |
|---|---|---|
| 3,790,834 | 2/1974 | Tanaka . |
| 3,826,939 | 7/1974 | Mori et al. . |
| 3,881,243 | 5/1975 | Bannon . |
| 3,932,929 * | 1/1976 | Hallerback et al. ................... 29/596 |
| 3,997,806 | 12/1976 | Noto et al. . |
| 4,032,807 | 6/1977 | Richter . |
| 4,059,780 | 11/1977 | Mazuir . |
| 4,074,157 | 2/1978 | Lace . |
| 4,105,907 | 8/1978 | Hagenlocher et al. . |
| 4,114,056 | 9/1978 | Nimura . |
| 4,204,810 | 5/1980 | Vogel . |
| 4,217,508 | 8/1980 | Uzuka . |
| 4,255,681 | 3/1981 | Gerber . |
| 4,259,603 | 3/1981 | Uchiyama et al. . |
| 4,260,925 | 4/1981 | Barrett . |
| 4,286,186 | 8/1981 | Hagenlocher et al. . |
| 4,329,606 | 5/1982 | Montagu . |
| 4,355,249 | 10/1982 | Kenwell . |
| 4,381,465 | 4/1983 | Renkl et al. . |
| 4,385,249 | 5/1983 | Fukushima . |
| 4,433,260 | 2/1984 | Weisbord et al. . |
| 4,446,392 | 5/1984 | Jaeschke . |
| 4,476,449 | 10/1984 | Gray et al. . |
| 4,501,984 | 2/1985 | Mishima . |
| 4,543,208 | 9/1985 | Horie et al. . |
| 4,554,491 | 11/1985 | Plunkett . |
| 4,588,915 | 5/1986 | Gold et al. . |
| 4,598,220 | 7/1986 | Stone . |
| 4,601,765 | 7/1986 | Soileau et al. . |
| 4,604,538 | 8/1986 | Merrill et al. . |
| 4,623,809 | 11/1986 | Westley . |
| 4,656,381 | 4/1987 | Komatsu . |
| 4,659,952 | 4/1987 | Unjo et al. . |
| 4,693,580 | 9/1987 | Hanamori et al. . |
| 4,695,419 | 9/1987 | Inariba . |
| 4,713,567 | 12/1987 | Fey et al. . |
| 4,724,347 | 2/1988 | Reinhardt et al. . |
| 4,728,833 | 3/1988 | Shiraki et al. . |
| 4,761,576 | 8/1988 | Savage . |
| 4,783,608 | 11/1988 | Gruber et al. . |
| 4,794,292 | 12/1988 | Torisawa . |
| 4,823,034 | 4/1989 | Wrobel . |
| 4,841,190 | 6/1989 | Matsushita et al. . |
| 4,864,176 | 9/1989 | Miller et al. . |
| 4,866,317 | 9/1989 | Katayama . |
| 4,891,567 | 1/1990 | Fujitani et al. . |
| 4,895,495 | 1/1990 | Arai . |
| 4,899,075 | 2/1990 | Hasebe . |
| 4,924,124 | 5/1990 | Kato . |
| 4,926,540 | 5/1990 | Kato . |
| 4,952,828 | 8/1990 | Yu-fang et al. . |
| 4,961,016 | 10/1990 | Peng et al. . |
| 4,972,109 | 11/1990 | Kakizaki et al. . |
| 4,987,331 | 1/1991 | Horng . |
| 4,990,806 | 2/1991 | Kikuchi et al. . |
| 5,001,379 | 3/1991 | Katayma . |
| 5,004,577 | 4/1991 | Ward . |
| 5,016,340 | 5/1991 | Kato . |
| 5,081,383 | 1/1992 | Kusumoto et al. . |
| 5,089,730 | 2/1992 | O'Connor et al. . |
| 5,093,599 | 3/1992 | Horng . |
| 5,095,612 | 3/1992 | McAvena . |
| 5,097,169 | 3/1992 | Fukushima . |
| 5,107,159 | 4/1992 | Kordik . |
| 5,121,017 | 6/1992 | Yamamoto et al. . |
| 5,121,021 | 6/1992 | Ward . |
| 5,132,603 | 7/1992 | Yoshimoto . |
| 5,147,601 | 9/1992 | Ohtsuka et al. . |
| 5,170,082 | 12/1992 | Nakagawa et al. . |
| 5,177,391 | 1/1993 | Kusase . |
| 5,237,230 | 8/1993 | Sugiyama et al. . |
| 5,245,236 | 9/1993 | Horng . |
| 5,254,892 | 10/1993 | Bosman et al. . |
| 5,270,604 | 12/1993 | Sandel et al. . |
| 5,277,500 | 1/1994 | Keck . |
| 5,283,495 | 2/1994 | Wendel et al. . |
| 5,291,084 | 3/1994 | Shiotsuki et al. . |
| 5,298,820 | 3/1994 | Lee et al. . |
| 5,313,125 | 5/1994 | Bosman et al. . |
| 5,313,698 * | 5/1994 | Schaefflmeier et al. ...... 264/272.2 X |
| 5,325,003 | 6/1994 | Saval et al. . |
| 5,327,037 | 7/1994 | Rasmussen . |
| 5,329,199 | 7/1994 | Yockey et al. . |
| 5,331,237 | 7/1994 | Ichimura . |
| 5,361,011 | 11/1994 | York . |
| 5,369,324 | 11/1994 | Saether . |
| 5,382,862 | 1/1995 | Ward et al. . |
| 5,492,458 | 2/1996 | Horng . |
| 5,519,933 | 5/1996 | Sakashita et al. . |
| 5,539,263 | 7/1996 | Lee . |
| 5,574,321 | 11/1996 | Baker . |
| 5,744,893 | 4/1998 | Zhao et al. . |
| 5,806,169 * | 9/1998 | Trago et al. ........................... 29/596 |
| 5,886,438 * | 3/1999 | Kawanishi ........................ 310/43 X |
| 5,952,760 | 9/1999 | Miyazawa et al. . |
| 5,962,938 | 10/1999 | Bobay et al. . |

\* cited by examiner

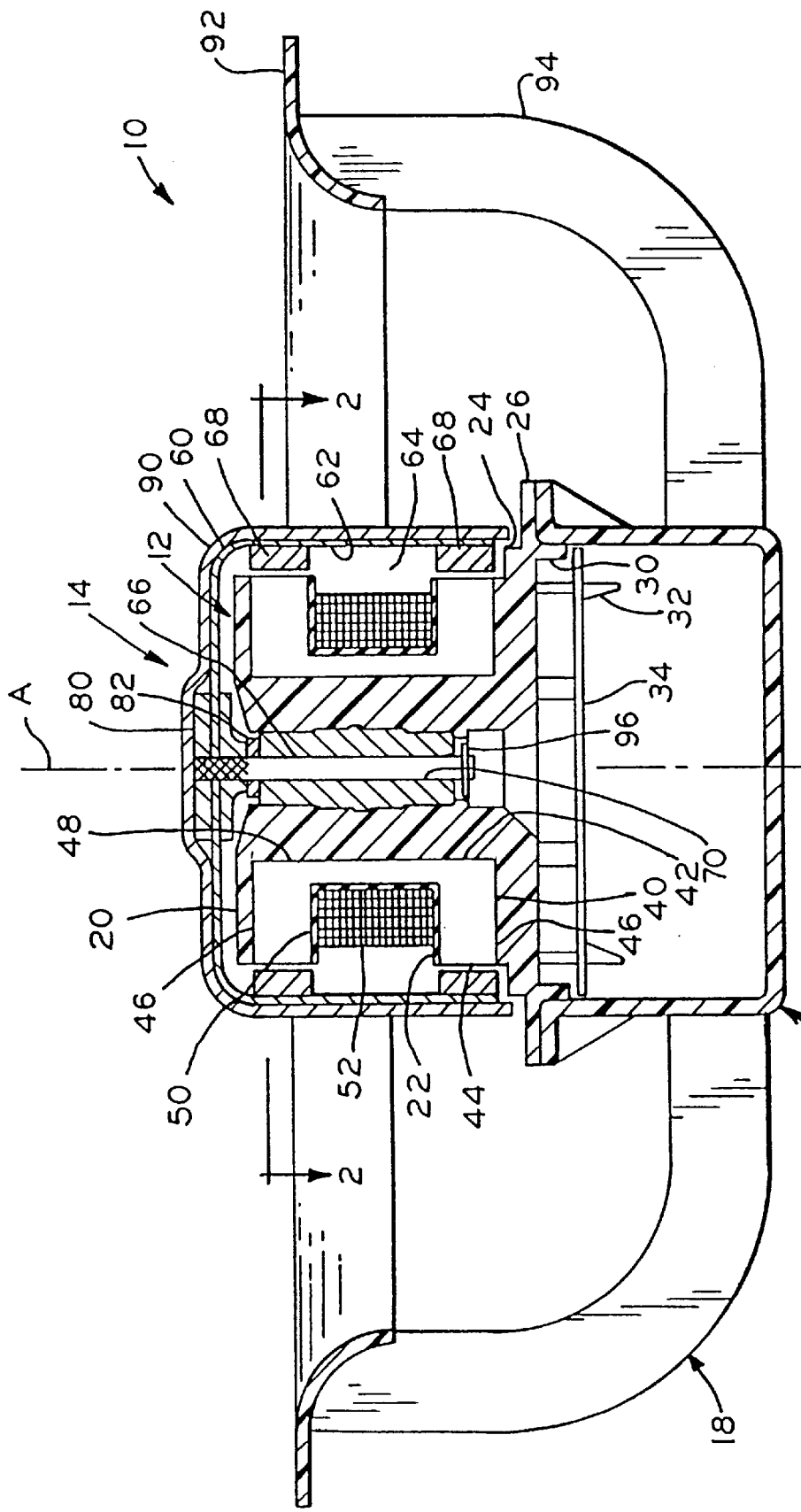
FIG_1

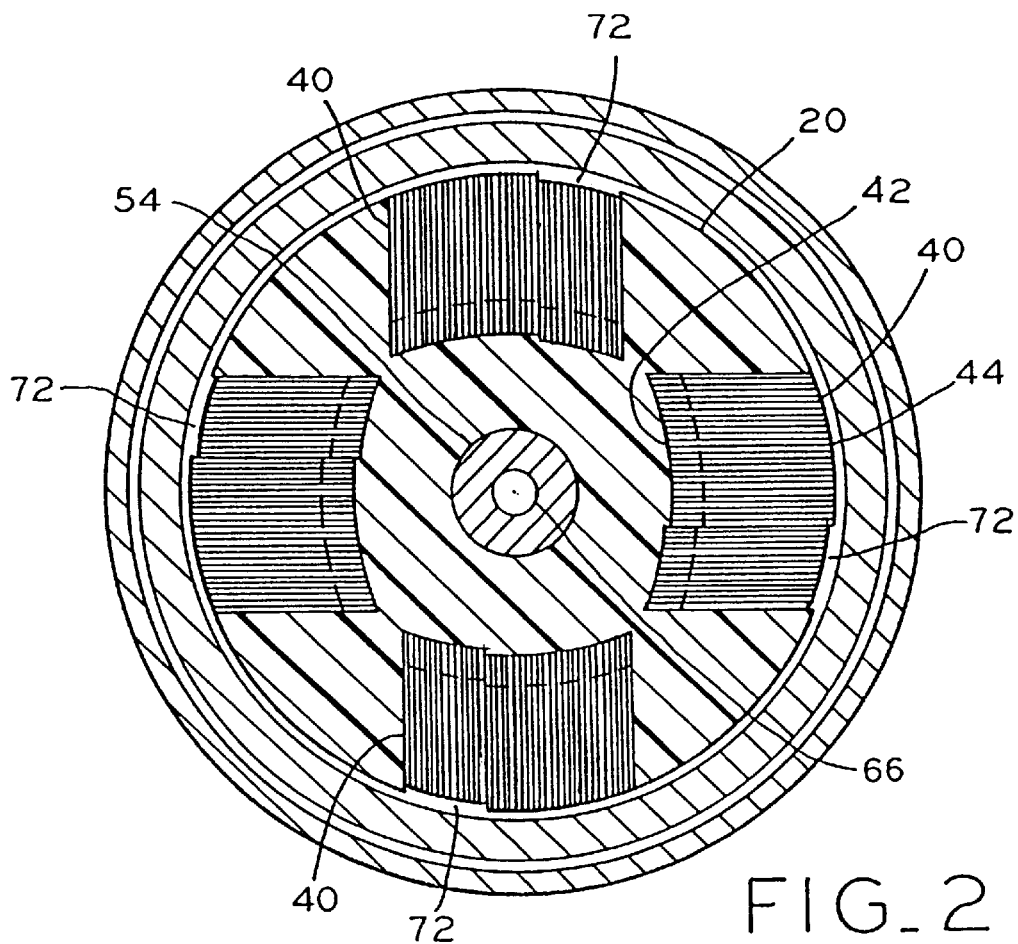
FIG_2
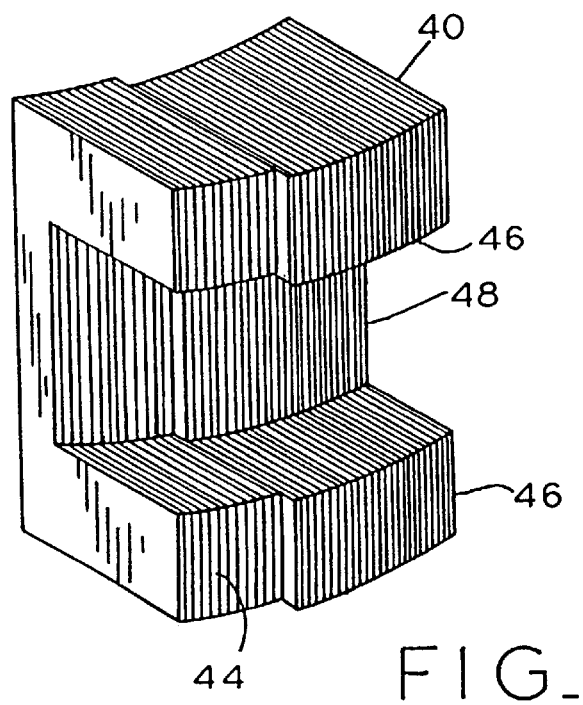
FIG_3

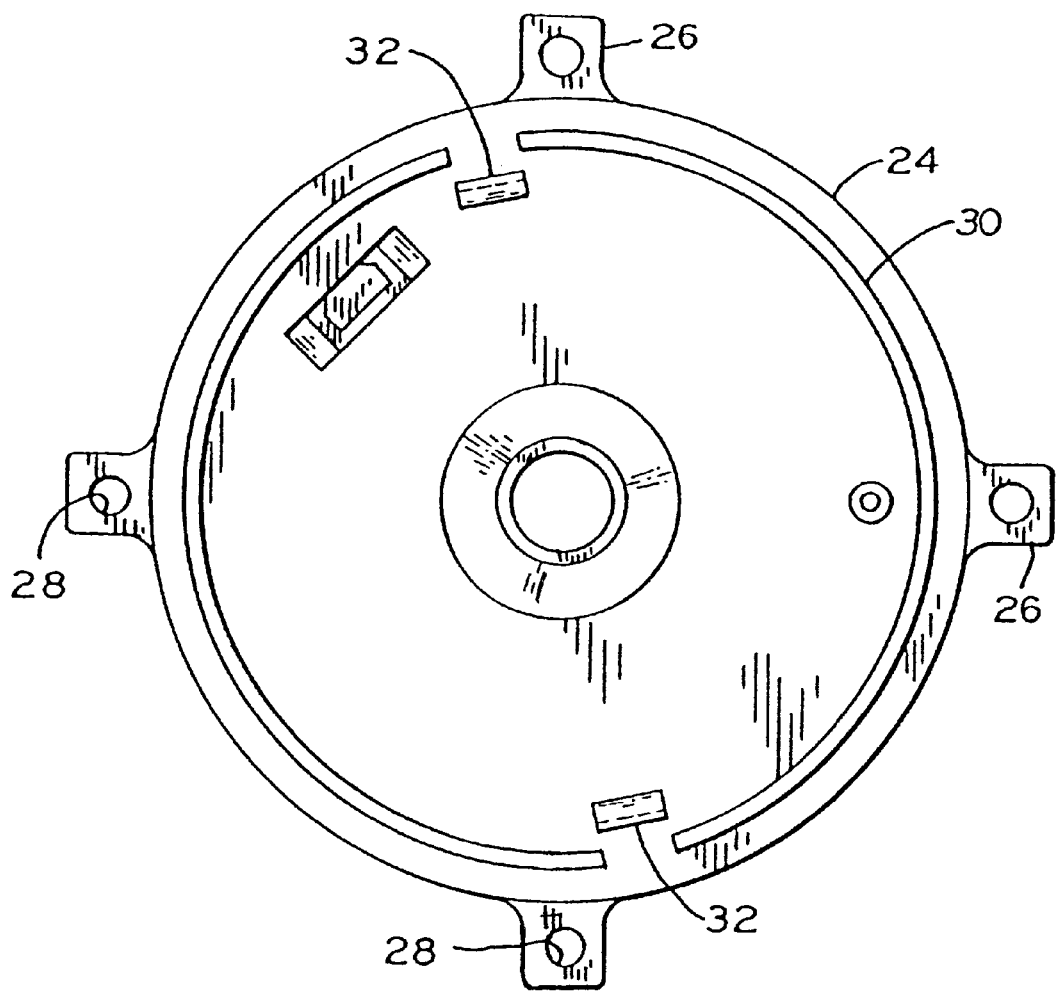
FIG_4

METHOD FOR ASSEMBLY OF MOTOR WITH EXTERNAL ROTOR

This application is a divisional of U.S. patent application Ser. No. 08/955,515, now U.S. Pat. No. 5,962,938, filed Oct. 21, 1997, which is incorporated herein by reference.

BACKGROUND OF THE INVENTION

This invention relates generally to electric motors and more specifically to a motor with an external rotor and a method for assembling the motor.

Motors with external rotors or "inside out motors" of the type to which the present invention generally relates have magnetic elements mounted on a rotor. These magnetic elements may include permanent magnets and/or electromagnets. A stator located inside the magnet elements includes a bearing for rotatably mounting a rotor shaft on the stator so that the rotor may rotate relative to the stator as a result of the magnetic interaction of the magnetic elements and magnetic fields generated by energizing windings of the stator. Typically, only one or two windings are wound on a bobbin of an inside out motor. Pole members provided around the bobbin, between the magnetic elements and the windings, direct the magnetic flux generated by the energized windings to improve the performance of the motor.

SUMMARY OF THE INVENTION

Generally, a method for assembling an inside out motor generally includes the steps of stacking a plurality of laminations together to form a pole member. A stator is molded around the pole member so that an end of the pole member is located adjacent an exterior surface of the molded stator. An electrically conductive magnet wire is wound around the molded stator adjacent the pole member to form a winding of the motor.

In another aspect of the invention, a method for molding a stator for use in an inside out motor includes stacking laminations together to form a pole member. The stator is molded around the pole member so that an end of the pole member is located adjacent an exterior surface of the molded stator. An electrically conductive magnet wire is wound around the molded stator adjacent the pole member.

Other objects and features of the invention will be in part apparent and in part pointed out hereinafter.

BRIEF DESCRIPTION OF THE DRAWINGS

FIG. 1 vertical cross section of an inside out motor of the present invention;

FIG. 2 is a cross section of the motor taken in the plane of line 2—2 of FIG. 1;

FIG. 3 is a perspective of a pole member of the motor of the present invention; and FIG. 4 is a bottom plan of a stator of the motor.

Corresponding reference characters indicate corresponding parts throughout the several views of the drawings.

DETAILED DESCRIPTION OF THE PREFERRED EMBODIMENTS

Referring now to the drawings, and in particular to FIG. 1, an inside out motor constructed according to the principles of the present invention is designated generally by the reference numeral 10. The motor 10 generally comprises a stationary assembly or stator (generally designated 12), a rotating assembly or rotor (generally designated 14) rotatably mounted on the stator, a control housing (generally designated 16) attached to the stator, and a mount (generally designated 18) connected to the control housing for mounting the motor on equipment (not shown).

The stator 12 of the motor 10 includes a generally cylindrical bobbin 20 having a channel 22 extending circumferentially around it. A base 24 is formed at one end of the bobbin 20 for connecting the bobbin to the control housing 16. As illustrated in FIG. 4, the bobbin base 24 includes four tabs 26 having holes 28 through which connectors (not shown) such as screw fasteners or rivets may be installed to connect the base to the control housing 16. Alternatively, the bobbin base 24 may be connected to the control housing 16 by heat staking or by ultrasonic welding. A generally annular rim 30 extending around the base 24 centers the housing 16 on the base. Two opposing latches 32 extending from the base 24 connect a circuit board 34 to the base 24 for controlling the operation of the motor 10. Although the bobbin 20 may be made of other materials without departing from the scope of the present invention, the bobbin of the preferred embodiment is made of an injection molded, electrically insulating polymeric material.

As illustrated in FIG. 2, four laminated pole members 40 are molded into the bobbin 20 for directing magnetic flux through the motor 10 as will be understood by those skilled in the art. Although these members 40 may be made of any magnetically soft material (i.e., material having a high magnetic permeability within a range of about 5000 gauss/oersted to about 7000 gauss/oersted) without departing from the scope of the present invention, the pole members of the preferred embodiment are made of motor steel.

As illustrated in FIG. 3, the pole members 40 are formed by stacking thin sheets of material or laminations together in a conventional manner. The sheets may be secured together in the stack using any suitable method such as by welding. Other methods for securing the sheets together include forming interlocks (not shown) on the sheets. Each sheet is provided with an oxide layer on its surface which resists the passage of electrical current between the sheets. Although other constructions are envisioned, the pole members 40 of the preferred embodiment are constructed so that they have two spaced-apart legs 46 extending from a cross-piece 48. The bobbin 20 is injection molded around the pole members 40 so that the legs 46 extend radially outward from the cross-piece 48. Moreover, one of the legs 46 is positioned on each side of the channel 22. The pole members 40 are constructed so their inner surfaces 42 and outer surfaces 44 are generally arcuate as shown in FIG. 2 to conform to the shape of the rotor and stator 14, 12, respectively. There may be more or fewer pole members 40 depending on the number of magnetic poles desired for the motor 10. A four pole motor is illustrated in a preferred embodiment.

As illustrated in FIG. 1, each pole member 40 is molded inside the bobbin 20 so that a portion 50 of the bobbin extends between the legs 46 of the pole member to electrically insulate the pole member from two windings (collectively designated 52) which are circumferentially wound around the bobbin between the legs of the pole member. The windings 52 of the preferred embodiment are made from copper wires wound in the channel 22 of the bobbin 20. Although two windings 52 are used in the preferred embodiment, a single winding or more than two windings may be used without departing from the scope of the present invention. The windings 52 are electrically connected to the control board 34 by conventional means.

A bearing 54 is molded into the bobbin 20 so it extends along a central axis A of the bobbin for rotatably receiving the rotor 14. Preferably, the bearing 54 is made from a powdered metal and is impregnated with a lubricant so it is self-lubricating over the entire life of the motor 10. Although the bearing 54 of the preferred embodiment is molded into the bobbin 20, it is envisioned that a bearing could be attached to the bobbin by other means, such as by press fitting or adhesive bonding, without departing from the scope of the present invention. In addition, it is envisioned that any bearing 54 may be located between the stator 12 and rotor 14 to permit the rotor to freely rotate with respect to the stator.

The rotor 14 comprises a bell 60 having an interior surface 62 defining an interior space 64, a shaft 66 having a longitudinal axis extending into the interior space, and two permanent magnetic strip elements 68 mounted on the rotor for directing a magnetic flux within the interior space of the rotor. The bearing 54 has a central longitudinal hole 70 which has a smaller diameter at each end than in the middle so the rotor shaft 66 only contacts the bearing near the ends of the hole. This arrangement provides solid support for the rotor 14 at two spaced locations and minimizes the overall contact area between the shaft 66 and the bearing 54. The shaft 66 is received through the bearing 54 and retained in position so that each of the pole member legs 46 is spaced radially inward from and at least partially aligned with one of the magnetic elements 68.

Although magnetic elements 68 having fewer or more pole pairs are envisioned as being within the scope of the present invention, each of the magnetic elements of the preferred embodiment has four pole pairs extending circumferentially around the interior space 64 of the rotor 14. In contrast, each sheet in the pole members 40 lies in a plane which is parallel to the flux paths of the magnetic fields generated by the windings 52. Therefore, the pole members 40 facilitate magnetic flux while inhibiting eddy currents.

The rotor shaft 66 is mounted on the rotor bell 60 by a cast insert 80 made of a mounting material (e.g., a zinc alloy). The insert 80 around the shaft 66 forms a spacer for operatively engaging the bearing 54 to axially space the rotor bell 60 from the bearing and stator 12. Other mounting means may be used without departing from the scope of the present invention. A disk 82 made of low friction material such as nylon or phenolic is disposed between the insert 80 and the bearing 54 to reduce friction between the insert and bearing.

In the preferred embodiments, the motor 10 is electronically commutated and is controlled by the printed circuit board 34 mounted on bobbin base 24. The control devices mounted on the circuit board 34 have not been illustrated in the drawings for clarity. As an example and not by way of limitation, the control circuitry may be a capacitively powered motor and constant speed control as described in co-assigned, co-pending U.S. patent application Ser. No. 08/761,748, filed Dec. 5, 1996, the entire disclosure of which is incorporated herein by reference.

The pole members 40 are asymmetrical as shown in FIG. 2 because the sheets at one end are offset inward from the other sheets. As will be understood by those skilled in the art, the asymmetry of the pole member 40 causes the rotor 14 to come to rest at a position where the poles of the permanent magnet strip elements 68 on the rotor 14 are not positioned halfway between adjacent poles of the stator 12. Further, the air gap 72 between the pole members 40 and the permanent magnet strip elements 68 is asymmetrical. Accordingly, a reluctance torque is produced during startup which urges the rotor 14 to rotate in a desired direction.

A preferred application for the inside out motor of the present invention is to drive a fan (not shown). As shown in FIG. 1, a cup-shaped hub 90 of the fan fits over the rotor bell 60 and is integrally formed with fan blades. A shroud 92 attached to the control housing 16 by four struts 94 (only two struts are visible in FIG. 1) is provided to attach the motor 10 to the equipment being cooled. Thus, it may be seen that the shroud 92 provides the sole means of support for the motor 10. The struts 94 are formed to hold the motor and fan rigidly against pitch and yaw motion, but to permit some small, dampened roll motion.

The inside out motor 10 of the present invention may be rapidly and accurately assembled from its component parts. The pole members 40 are formed by stamping the C-shaped sheets from magnetically soft sheet material, and stacking the sheets together as described above. Four of the pole members 40 are positioned in a mold along with a bearing 54 and plastic is injected into the mold around the members and bearing to form the bobbin 20. The bobbin 20 is preferably molded from a suitable polymeric material and wound with one or more windings 52. When more than one winding 52 is used, the windings may be bifilar or wound one over the other in a layered arrangement. In the illustrated embodiment, there are two windings 52, the terminal ends of which are received in respective connector portions (not shown) of the bobbin 20.

The rotor shaft 66 is attached in the interior space 64 of the rotor bell 60 with the insert 80 leaving the spacer formed from the mounting material. The permanent magnet strip elements 68 formed as annular strips of magnetized material are mounted on the interior surface 62 of the rotor bell 60. However, there may be separate magnets (not shown) spaced around the interior surface 62 of the rotor bell 60 without departing from the scope of the present invention. The magnetic elements 68 are magnetized to have eight distinct poles spaced around the element. In this preferred embodiment, the poles of the magnet elements 68 are circumferentially offset with respect to each other. The angle of offset is preferably about 10°–15° for the eight pole motor of the illustrated embodiment. It is to be understood that other angles of offset are also envisioned as being within the scope of the present invention.

The fan is formed in a suitable manner, such as by molding the hub 90 and fan blades as one piece from polymeric material, and fitted over the rotor bell 60. The hub 90 is secured to the rotor bell 60 in a suitable manner such as by heat staking, snap fitting or press fitting. The low friction disk 82 is placed on the rotor shaft 66, which is then inserted through the hole 70 in the bearing 54 of the stator. A C-clip 96 is snapped onto a grooved distal end of the rotor shaft 66 to secure the shaft in the bearing 54.

The printed circuit board 34 for the motor 10 is attached to the bobbin base 24 without the use of fasteners. More specifically, the circuit board 34 has a pair of diametrically opposed notches (not shown) in its periphery which are aligned with snap latches 32 formed in the base 24. The elasticity of the latches 32 permits them to flex outwardly as the circuit board 34 is pushed toward the base 24, and the resiliency of the latches causes them to snap radially inwardly so that they overlie the circuit board to hold it on the base. As the printed circuit board 34 is mounted on the bobbin base 24, electrical connections for the windings 52 are made. The control housing 16 and mount 18 are them attached to the base 24 by fasteners are described above.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A method for assembling an inside out motor comprising the steps of:

stacking a plurality of generally planar laminations together to form a pole member the laminations being stacked to form two legs in the pole member, said two legs being joined by a cross-piece and positioned at generally axially opposite ends of the stator;

molding material around the pole member to form a molded stator so that an end of the pole member is located adjacent an exterior surface of the molded stator;

winding an electrically conductive magnet wire around the molded stator adjacent the pole member to form a winding of the motors;

each lamination of the pole member oriented to lie in a plane which is parallel to flux paths of magnetic fields generated by the winding to facilitate magnetic flux while inhibiting eddy currents.

2. A method for assembling an inside out motor as set forth in claim 1 further comprising the step of attaching a bearing to the stator by molding the stator around the bearing so that the bearing is positioned at a central axis of the molded stator.

3. A method for assembling an inside out motor as set forth in claim 2 further comprising the step of mounting a rotor on the bearing.

4. A method for assembling an inside out motor as set forth in claim 1 further comprising the step of mounting a printed circuit board adjacent a base of the stator.

5. A method for assembling an inside out motor comprising the steps of:

stacking a plurality of laminations together to form a pole member, the laminations being stacked to form two legs in the pole member, said two legs joined by a cross-piece;

molding material around the pole member to form a molded stator so that said two legs are positioned at generally axially opposite ends of the stator and so that ends of the legs are located adjacent a peripheral surface of the molded stator;

winding an electrically conductive magnet wire around the molded stator adjacent the pole member to form a winding of the motor; and rotatably mounting an external rotor on the stator so as to define an air gap between the peripheral surface of the molded stator and an inwardly facing surface of the rotor.

6. A method for assembling an inside out motor as set forth in claim 5 wherein the step of winding includes positioning the magnet wire generally between the legs of the pole member.

* * * * *

UNITED STATES PATENT AND TRADEMARK OFFICE
CERTIFICATE OF CORRECTION

PATENT NO.    : 6,286,199 B1
DATED         : September 11, 2001
INVENTOR(S)   : Dennis P. Bobay et al.

It is certified that error appears in the above-identified patent and that said Letters Patent is hereby corrected as shown below:

<u>Column 5,</u>
Line 20, delete "motors;" and insert therefor -- motor; --.

Signed and Sealed this

Nineteenth Day of August, 2003

JAMES E. ROGAN
*Director of the United States Patent and Trademark Office*